(No Model.)
G. W. WOODSIDE.
NUT SHELL SEVERING MACHINE.
No. 442,657. Patented Dec. 16, 1890.
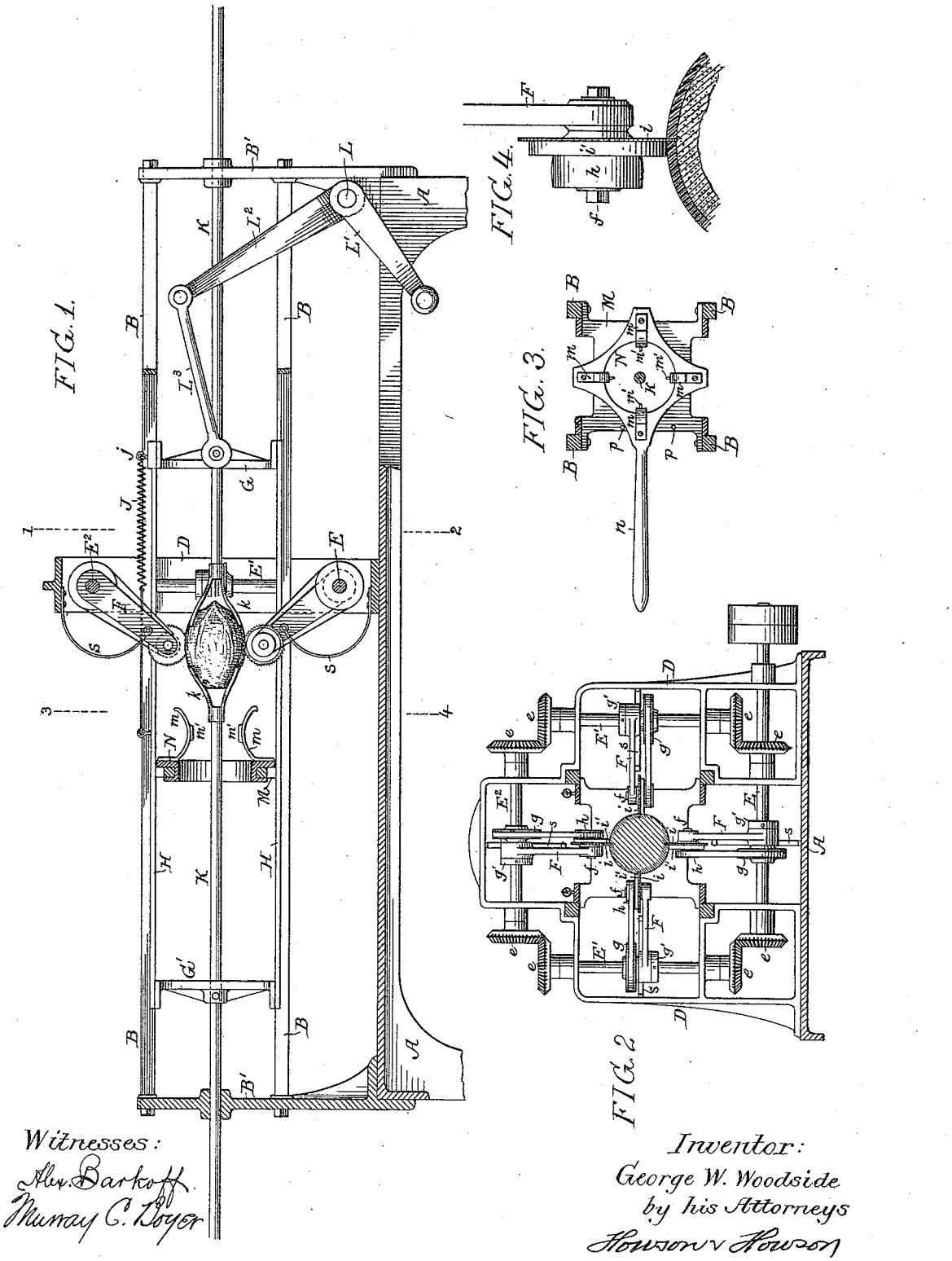
Witnesses:
Alex. Barkoff
Murray C. Boyer
Inventor:
George W. Woodside
by his Attorneys
Howson v Howson

UNITED STATES PATENT OFFICE.

GEORGE W. WOODSIDE, OF PHILADELPHIA, PENNSYLVANIA, ASSIGNOR OF ONE-HALF TO WILLIAM F. GILLIN, OF SAME PLACE.

NUT-SHELL-SEVERING MACHINE.

SPECIFICATION forming part of Letters Patent No. 442,657, dated December 16, 1890.

Application filed May 3, 1890. Serial No. 350,441. (No model.)

*To all whom it may concern:*

Be it known that I, GEORGE W. WOODSIDE, a citizen of the United States, and a resident of Philadelphia, Pennsylvania, have invented an Improved Nut-Shell-Severing Machine, of which the following is a specification.

The object of my invention is to construct a machine for serrating the shell of a cocoanut or other nut in order that it can be more readily removed without disturbing the meat of the cocoanut. This object I attain in the manner which I will now proceed to describe, reference being had to the accompanying drawings, in which—

Figure 1 is a longitudinal section of my improved machine for removing the shells of nuts. Fig. 2 is a transverse section on the line 1 2, Fig. 1. Fig. 3 is a transverse section on the line 3 4, Fig. 1. Fig. 4 is an enlarged view showing the action of one of the saws.

A is the base of the machine.

B B are longitudinal guide-bars running the full length of the machine and supported at each end by vertical frames B', which are mounted on the base A. These guide-frames guide the carriage on which is secured the cocoanut or other nut to be serrated.

D is a central frame, and mounted on this frame are swinging saws for serrating the cocoanut as it passes through the frame.

E is a transverse shaft having at one end driving-pulleys, and geared to this shaft are two vertical shafts E' E' by bevel-gears $e$, and geared to these vertical shafts by bevel-gear $e$ is a transverse shaft $E^2$. On each of these shafts is a carrying-frame F, having spindles $f$, and on each spindle is mounted the saw $i$, guiding-flange $i'$, and the pulley $h$.

Secured to each of the shafts E E' $E^2$ are driving-pulleys $g$, a belt passing over each of these pulleys and over the pulley $h$ on each of the spindles. Thus it will be seen that all the saws are driven from the main shaft E through the medium of the gearing. (Clearly shown in Fig. 2.)

Each carrying-frame is loose on its shaft, but is confined longitudinally thereon by the pulley $g$ on one side and a collar $g'$ on the opposite side, after the saws are once adjusted to the proper position on a line with the center of the nut. Springs $s$, secured to the frame and to the arms, return the arms to their normal position.

The object of having the saws mounted on the swinging frame is to accommodate the different diameters of the nuts as they pass through the machine, so that the saws will cut a regular kerf into the shell through its entire length.

By having the guiding-flange $i'$ adjacent to the saw it prevents the saw cutting into the kernel or meat of the nut. The depth of cut can be regulated in the first instance, as the shells average a certain thickness.

The two cross-heads G G' of the carriage are connected together by longitudinal bars H, these bars being secured to the cross-head G' and slide in ways in the cross-head G, and tying the two together are spring-rods J, one end of the rod being secured to a pin or eye $j$ on the cross-head G and the other end being secured to a pin or eye on the bars H or cross-head G'.

Carried by the cross-heads G G' are two central bars K K', having at their inner ends spring clamping-jaws $k\ k$, the fingers of said jaws clamping the cocoanut to the frame.

L is a crank-shaft, to which is applied the crank L', and secured to this crank-shaft is an arm $L^2$, this arm being connected to the cross-head G by a rod $L^3$, so that on the movement of the crank the carriage composed of the two cross-heads G G' will be moved longitudinally on the ways, feeding the cocoanut to the machine past the saws. On the return movement of the carriage the cross-head G' will be stopped by coming in contact with the frame M or other stop; but the cross-head G' will still continue on its movement, thus separating the two jaws and allowing the serrated nut to fall clear of the machine, the operator then placing another nut in position and the spring draws the cross-heads together, clamping the nut to be serrated.

When it is required to sever the nut any more than in four lines, I use a clutch-feeding mechanism constructed in the following manner, by which the nut can be rotated on its axis, in order to make more than four longitudinal kerfs—as, for instance, if the clutch-feed is arranged to turn one-eighth of a revolution the cocoanut will be passed through the machine twice, making eight incisions, and by making a shorter feed more incisions can be made. The frame M is secured to the longitudinal ways B, and carried by this frame and mounted thereon is the clutch N, having a handle n by which it is operated. Projecting from the clutch are the spring-jaws m, having projections m', which fit the kerfs made by the saws. When the carriage is moved to its extreme forward position, the nut is in line with the jaws of the clutch, the projections m' engaging with the kerfs in the nut, and by simply turning the clutch by means of the handle it can be turned the distance indicated by the adjustment of the pins p p, either to move it an eighth, a sixteenth, or more, as desired.

I claim as my invention—

1. The combination, in a machine for scoring the shells of nuts, of the carriage on which the nut to be scored is secured, and the saws mounted in the path traveled by the nut, whereby on the forward movement of the carriage the nut will pass the saws, substantially as described.

2. The combination of the frame, guideways on said frame, carriage on said guideways, clamping devices on the carriage for the nut to be scored with a frame, horizontal shaft mounted in said frame, and swinging saw-carrying arm mounted on said shaft with a saw, substantially as described.

3. The combination of the frame of the machine, longitudinally-moving carriage thereon, and saw for serrating the nut, clamped on the carriage, with a clutch having spring-arms which engage with the nut and by which the nut is turned on the carriage, substantially as described.

4. The combination of the frame, a series of saws mounted on said frame, and cross-heads G G', forming a carriage, clamps on each cross-head, one of said cross-heads being free to move independently of the other to allow the clutches to open and release the nut, substantially as described.

5. The combination of the saws, cross-heads G G', and connecting-bars H, said bars fastened at one end to one of the cross-heads and adapted to slide in the other cross-head, with springs tending to draw the cross-heads together, with a stop to stop the return movement of one of the cross-heads, allowing the other cross-head to have an extended movement, substantially as and for the purpose described.

6. The combination, in a machine for serrating the shells, of the carriage on which is mounted the nut to be serrated, a saw i, and a flange i', to regulate the depth of cut, substantially as described.

7. The combination of the frame, carriage adapted to slide on said frame, and clamps on the carriage for the nut, with a frame B, vertical and horizontal shafts on said frame, gearing whereby the shafts are driven together, arms on each of said shafts, a spindle on the outer end of each arm, a saw and a pulley mounted on each spindle, belt-pulleys on the shafts, and belts passing over the belt-pulleys and over the pulleys on the spindles, and springs for retaining the arms in their normal position, substantially as described.

In testimony whereof I have signed my name to this specification in the presence of two subscribing witnesses.

GEORGE W. WOODSIDE.

Witnesses:
EUGENE ELTERICH,
HARRY SMITH.